Patented July 18, 1950

2,515,465

UNITED STATES PATENT OFFICE 2,515,465

PREPARATION OF 2-ALKYL-4-ISOPROPYL-IDENE-5(4)-OXAZOLONES

Ralph Mozingo, Elizabeth, and Karl Folkers, Plainfield, N. J., and Nelson R. Easton, Champaign, Ill., assignors to Merck & Co., Inc., Rahway, N. J., a corporation of New Jersey No Drawing. Application March 22, 1946, Serial No. 656,511

4 Claims. (Cl. 260—307)

This invention relates to certain new chemical compounds, and particularly to intermediates useful in the preparation of penicillamine, a primary intermediate in the synthesis of penicillin, and to processes for preparing such compounds.

d-Penicillamine has been prepared from penicillin by hydrolyzing a salt of penicillin with hot dilute mineral acid (Nature 151, 107 (January 23, 1943)). It has been determined that the product thus obtained is an $\alpha$-amino acid of the d- or "unnatural" series having a structure fully defined by the chemical names d-$\alpha$-amino-$\beta$-mercaptoisovaleric acid, or d - $\beta,\beta$ - dimethyl cysteine.

It is now discovered, in accordance with the present invention, that penicillamine can be prepared synthetically from the readily available amino acid, valine, by converting the same to an N-$\alpha$-haloacyl derivative, forming a salt or addition compound of the N-$\alpha$-haloacyl derivative with a nitrogenous heterocyclic compound having a pyridine nucleus, converting the salt to a 2-substituted-4-isopropylidene-5(4)-oxazolone compound of the formula $$(CH_3)_2C=C-C=O$$
$$\phantom{(CH_3)_2C=C-}|\phantom{-}\diagdown O$$
$$\phantom{(CH_3)_2C=}N=C\diagup$$
$$\phantom{(CH_3)_2C=N=}|$$
$$\phantom{(CH_3)_2C=N=}R$$

wherein R is alkyl, and then converting the oxazolone to dl-penicillamine, preferably in the manner disclosed in a co-pending joint application of two of the present applicants, Sheehan, Mozingo, Folkers, and Tishler, Serial No. 656,512, filed March 22, 1946, now U. S. Patent 2,477,148, by reacting the oxazolone, its hydration product $\alpha$-acylamino-$\beta,\beta$-dimethylacrylic acid, or an ester thereof in absolute methanol with hydrogen sulfide, preferably in the presence of sodium methylate, and hydrolyzing the N-acyl penicillamine or N-acyl penicillamine ester thus obtained to dl-penicillamine by treating with aqueous mineral acid.

In carrying out the process of the present invention, dl-valine, or either of the isomers d-valine or l-valine, in aqueous alkaline solution such as about 1 N sodium hydroxide is reacted with an $\alpha$-haloacyl halide such as chloroacetyl chloride which is preferably added slowly while cooling the reaction mixture. After completion of the reaction, the reaction mixture is acidified with aqueous mineral acid such as hydrochloric acid, concentrated to small volume causing crystallization of an N-$\alpha$-haloacyl valine such as dl-N-$\alpha$-chloroacetyl valine.

When the N-$\alpha$-haloacyl valine is reacted with pyridine or other nitrogenous heterocyclic compound containing a pyridine nucleus, a salt or addition product is obtained in crystalline form, and can be purified by recrystallization from a suitable solvent mixture such an alcohol-dioxane mixture.

The salt of the chloroacetyl-dl-valine or other N-$\alpha$-haloacyl valine is then reacted with acetic anhydride and the reaction mixture is subjected to fractional distillation and sublimation by heating under reduced pressure (about 0.1 mm. of mercury) at temperatures up to about 100° C. Liberated N-heterocyclic compound, excess acetic anhydride, and acetic acid formed in the reaction come over at about room temperature or slightly above and are discarded. At higher temperatures, the product 2 - methyl-4 - isopropylidene-5(4)-oxazolone, or other compound substituted in the 2-position with an alkyl group characteristic of the particular $\alpha$-haloacyl halide originally employed, comes over and is collected and crystallized from a suitable solvent such as petroleum ether.

The oxazolone compound must be kept under anhydrous conditions as it readily takes on a mole of water even by contact with small amounts of moisture in the air to form the corresponding $\alpha$ - acylamino - $\beta,\beta$ - dimethylacrylic acid.

It is to be noted, however, that the hydrated products such as $\alpha$-acylamino-$\beta,\beta$-dimethylacrylic acids and esters thereof are as well suited as the oxazolone compounds for use as intermediates in the preparation of penicillamine. When it is desired to prepare the $\alpha$-acylamino-$\beta,\beta$-dimethylacrylic acid rather than the oxazolone, the reaction mixture obtained by treating the addition product, such as the pyridine salt of N-$\alpha$-chloroacetyl-dl-valine with acetic anhydride, is poured into water, extracted with chloroform, and the chloroform solution evaporated to yield a solid residue of $\alpha$-acylamino-$\beta,\beta$-dimethylacrylic acid which is readily purified by recrystallization from acetone.

An ester of the α-acylamino-β,β-dimethylacrylic acid can be prepared by adding the reaction mixture above mentioned to an anhydrous alcohol such as methyl alcohol, ethyl alcohol, benzyl alcohol, or the like whereupon the corresponding ester of the α-acylamino-β,β-dimethylacrylic acid is formed by alcoholic hydrolysis. The excess reactants can be removed by subliming under vacuum, and the ester purified by crystallization from chloroform and from acetone.

The reactions described above are diagrammatically illustrated as follows:

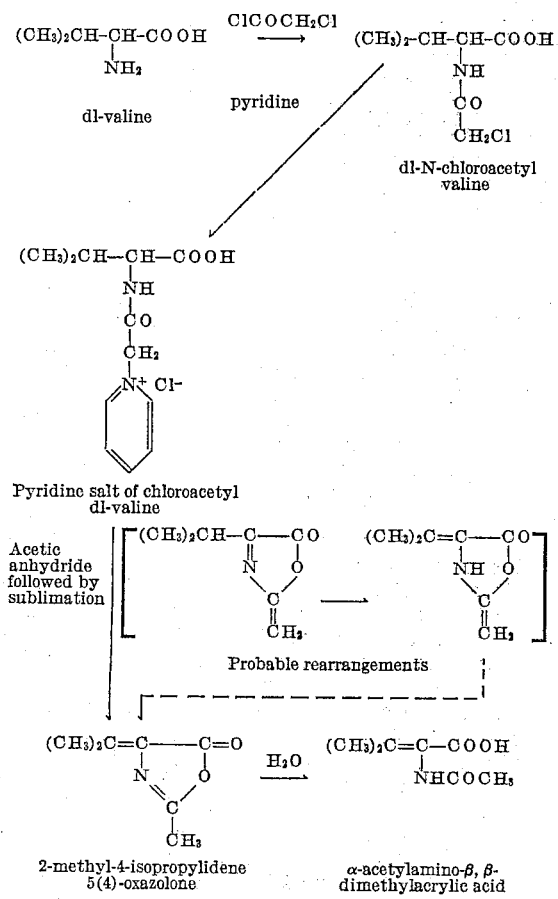

The following examples illustrate methods of carrying out the process and preparing the new products of the present invention, but it is to be understood that these examples are given by way of illustration and not of limitation.

*Example I*

A solution of 29.2 g. of dl-valine in 250 ml. of 1 N sodium hydroxide was cooled in an ice bath. The solution was stirred while 28.25 g. of chloroacetyl chloride was added slowly. Simultaneously, 250 ml. of 1 N sodium hydroxide was added in small portions. When all the chloroacetyl chloride and sodium hydroxide has been added (about thirty minutes), the mixture was stirred for about forty minutes in the ice bath. A solution of 20.5 ml. of concentrated hydrochloric acid in 50 ml. of water was added. The solution was concentrated at reduced pressure to about half its volume. The crystals which came out were removed by filtration and recrystallized from water-methanol. The dl-N-chloroacetyl valine weighed 19.3 g. and melted at 128–130° C.

Analysis: Calculated for $C_7H_{13}O_5NCl$: C, 43.41; H, 6.25; N, 7.23. Found: C, 43.21; H, 6.18; N, 7.22.

*Example II*

The preparation was repeated by the method of Example I using 50 g. of valine in 423 ml. of 1 N sodium hydroxide, then adding 51 g. of chloroacetyl chloride and 450 ml. of 1 N sodium hydroxide. The N-chloroacetyl-dl-valine, M. P. 126–127° C., weighed 58.8 g.

*Example III*

A solution of 3 g. of chloroacetyl-dl-valine in 5 ml. of pyridine was heated on a steam bath for about five minutes. The solution was cooled in an ice bath. The crystals which formed were removed by filtration. These were dissolved in methanol, but would not come out on addition of ether. A second crop of crystals came out of the mother liquors and were recrystallized from dioxane and ethyl alcohol. This product, the pyridine salt of N-chloroacetyl-dl-valine, melted at 212–213° C.

Analysis: Calculated for $C_{12}H_{17}N_2O_5Cl$: C, 52.84; H, 6.28; N, 10.27. Found: C, 53.18; H, 6.28; N, 10.01.

This preparation was repeated as follows:

A mixture of 10 g. of chloroacetyl-dl-valine in 20 ml. of pyridine was heated on the steam bath for about thirty minutes. After this time the entire mass was solid. The product was recrystallized from an alcohol-dioxane mixture to give 12 g. of the pyridine addition product.

*Example IV*

To 1 g. of the pyridine salt of chloroacetyl-dl-valine was added sufficient acetic anhydride to cover it. The mixture was heated on a steam bath until a clear solution resulted. The solution was poured into water and continuously extracted with chloroform. Evaporation of the chloroform left a solid residue. The solid was recrystallized from acetone and melted at 198–200°. This is α-acetylamino-β,β-dimethylacrylic acid.

Since the intermediate 2-methyl-4-isopropylidene-5(4)-oxazolone was hydrolyzed without isolation, the preparation was repeated and the products of the reaction sublimed at 0.1 mm. pressure with a bath temperature up to 100°. The acetic anhydride and acetic acid came over at room temperature and were discarded. The oxazolone was then collected and crystallized from petroleum ether; M. P. 35–36° C. (The oxazolone must be kept under anhydrous conditions as it reacts with moisture in the air to give α-acetylamino-β,β-dimethylacrylic acid.)

Modifications may be made in carrying out the present invention without departing from the spirit and scope thereof, and our invention is to be limited only by the appended claims.

We claim:

1. The process that comprises reacting valine having an N-substituent of the formula —COX where X is an α-halogenated lower alkyl group, with pyridine, separating from the reaction mixture the crystalline addition compound thus formed, and reacting said crystalline addition compound with acetic anhydride thereby forming a 2-alkyl-4-isopropylidene-5(4)-oxazolone.

2. The process that comprises reacting acetic anhydride with the crystalline addition compound obtained by treating valine, having an N-substituent of the formula —COX where X is an α-halogenated lower alkyl group, with pyridine, thereby forming a 2-alkyl-4-isopropylidene-5(4)-oxazolone.

3. The process that comprises reacting dl-N-chloracetyl valine with pyridine, separating from the reaction mixture the crystalline addition compound thus formed, and reacting said crystalline addition compound with acetic anhydride thereby forming 2-methyl-4-isopropylidene-5(4)-oxazolone.

4. The process that comprises reacting acetic anhydride with the crystalline addition compound of N-chloracetyl valine and pyridine, thereby forming 2-methyl-4-isopropylidene-5(4)-oxazolone.

RALPH MOZINGO.
KARL FOLKERS.
NELSON R. EASTON.

REFERENCES CITED

The following references are of record in the file of this patent:

UNITED STATES PATENTS

| Number | Name | Date |
|---|---|---|
| 743,986 | Nicolaier et al. | Nov. 10, 1903 |
| 2,247,266 | Wibaut et al. | June 24, 1941 |
| 2,301,829 | Studer | Nov. 10, 1942 |
| 2,375,885 | Babcock | May 15, 1945 |
| 2,431,967 | Safir et al. | Dec. 2, 1947 |

OTHER REFERENCES

Bergmann et al., "Liebigs Annalen," vol. 448 (1926), pp. 20 to 31.

Bergmann et al., "Liebigs Annalen," vol. 458 (1927), pp. 76 to 77.

Bergmann et al., "Ber. deut. Chem.," vol. 64 (1931), pp. 2315 to 2322.

Ramage et al., "Jour Chem. Soc." (London), 1935, pp. 534 to 535.

Doherty et al., "J. Biol. Chem.," vol. 147 (1943), pp. 618, 619, 623 and 624.

Cornell Report D-I, CPS 114, February 3, 1944, pp. 1, 2 and 5.

Merck Report XII d, February 18, 1944, CPS 134, pp. 4 and 5.

British Report B-86, CPS-200, July 20, 1944, page 1.

Abderhalden et al., "Fermentforschung," vol. 10, page 220.